United States Patent [19]

Kimberlin

[11] Patent Number: 5,325,950

[45] Date of Patent: Jul. 5, 1994

[54] LUBRICANT REMOVER FOR A WRAP SPRING CLUTCH

[75] Inventor: Robert R. Kimberlin, Troutville, Va.

[73] Assignee: Ingersoll-Rand Company, Woodcliff Lake, N.J.

[21] Appl. No.: 111,231

[22] Filed: Aug. 24, 1993

Related U.S. Application Data

[63] Continuation of Ser. No. 937,035, Aug. 31, 1992, abandoned.

[51] Int. Cl.⁵ .................. F16D 13/08; F16D 41/34; F16D 13/74
[52] U.S. Cl. .................. 192/415; 192/81 C; 192/107 T; 192/113.32; 192/113.36
[58] Field of Search ............ 192/41 S, 81 C, 107 T, 192/113 LC, 113 BG, 113 LR; 173/97, 111

[56] References Cited

U.S. PATENT DOCUMENTS

| | | |
|---|---|---|
| Re. 25,229 | 8/1962 | Sacchini et al. |
| 390,029 | 9/1888 | Lombard |
| 1,640,472 | 8/1927 | Starkey .............. 192/41 S |
| 1,789,117 | 1/1931 | Smith |
| 1,934,252 | 11/1933 | Baker |
| 2,479,965 | 8/1949 | Ragsdale ............ 192/41 S |
| 2,615,543 | 10/1952 | Maeser ............... 192/41 S |
| 2,643,749 | 6/1953 | Greenlee |
| 2,700,373 | 1/1955 | Feucht |
| 2,910,046 | 10/1959 | Lear |
| 2,979,925 | 4/1961 | Hungerford, Jr. |
| 3,166,131 | 1/1965 | Worman |
| 3,370,680 | 2/1968 | Bangerter et al. |
| 3,463,246 | 8/1969 | Bronnert |
| 4,235,133 | 11/1980 | Acevedo |
| 4,270,637 | 6/1981 | Lowery |
| 4,427,100 | 1/1984 | Rude et al. |
| 5,139,093 | 8/1992 | Lyon et al. ......... 192/41 S X |

FOREIGN PATENT DOCUMENTS

| | | | |
|---|---|---|---|
| 478084 | 10/1951 | Canada ............... | 192/41 S |
| 58-211023 | 12/1983 | Japan ................. | 192/81 C |

Primary Examiner—Richard M. Lorence
Attorney, Agent, or Firm—John J. Selko

[57] ABSTRACT

A wrap spring clutch, for use in a percussion device activated by a fluid having a lubricant therein, includes a plurality of grooves in at least one of the friction engagement surfaces of the wrap spring clutch, to transmit a portion of the lubricant away from the friction zone of the clutch, to enhance the friction performance of the clutch. The grooves can be parallel and separate, or a single, continuous spiral groove.

6 Claims, 3 Drawing Sheets

LUBRICANT REMOVER FOR A WRAP SPRING CLUTCH

This application is a continuation of U.S. patent application Ser. No. 07/937,035, filed Aug. 31, 1992, now abandoned.

BACKGROUND OF THE INVENTION

This invention relates generally to wrap spring clutches used in percussive pneumatic devices, and more particularly to wrap spring clutches used in fluid activated drills in which a lubricating oil is carried into the drill by the fluid, for lubricating moving parts therein.

One of the most disruptive things that can happen to the clutch is for it to be subjected to extreme amounts of oil. When the spring parts are new, the edges of the spring are very well defined. As the clutch begins to wear, the edges of the spring begin to flatten. As the flattened edge gets larger and the surface area increases, the oil trapped between the spring and its mating surface generates a hydrodynamic effect which acts like a bearing. The oil separates the spring from its mating part which reduces the efficiency of the clutch.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a wrap spring in frictional helical engagement with a portion of a first frictional hub surface and a second frictional hub surface, wherein relative rotary motion between the first hub and the second hub is permitted in a first direction and restricted in a second direction; and means on at least one hub surface for transmitting a portion of lubricant from an activating fluid below the plane of the surface of the hub, whereby the frictional engagement of the wrap spring is improved.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
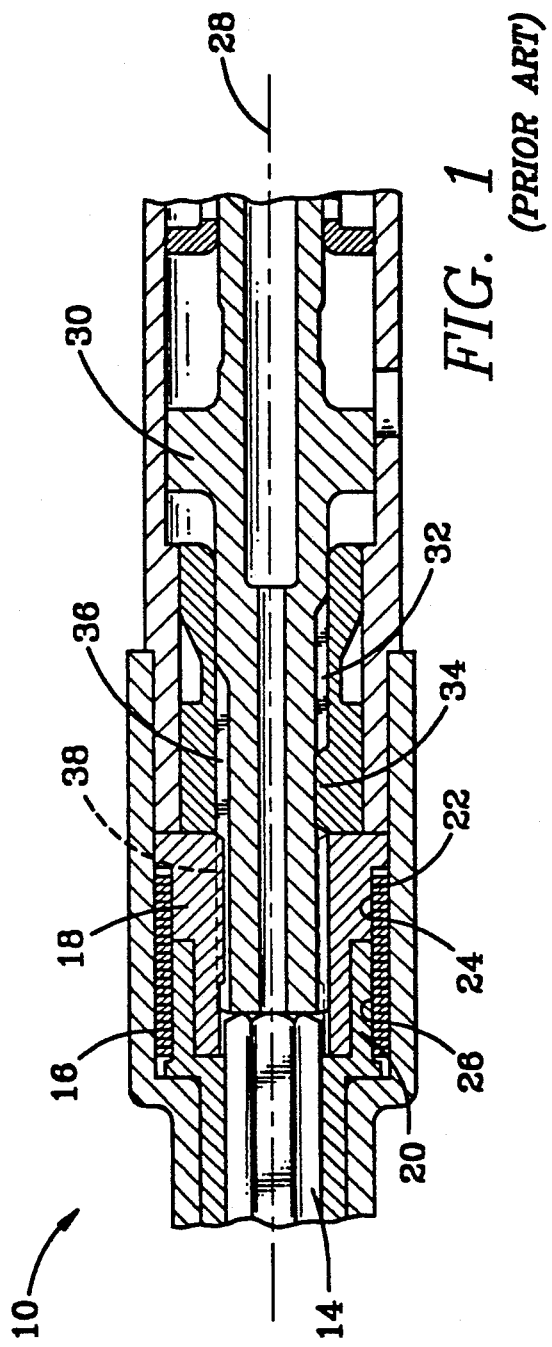
FIG. 1 is a side cross sectional view, with parts removed, of a prior art percussive apparatus having a wrap spring clutch.

Now referring to FIG. 1, in a percussive apparatus 10, generally a jackhammer or rock drill, it is desired to apply rotary motion to a drill steel 14. A wrap spring clutch assembly 16 accomplishes this transmissions of rotary motion. A description of such a wrap spring clutch is found in U.S. Pat. No. 5,139,093 to Leland H. Lyon et al, and that disclosure is incorporated herein by reference.

As shown in FIG. 1, the wrap spring assembly 16 includes a first hub 18, a second hub 20 and a wrap spring 22. A first, exterior, frictional hub surface 24 is formed on first hub 18 while a second, exterior, frictional hub surface 26 is formed on the second hub 20. Each hub 18, 20 has a longitudinal axis, and these axes coincide with longitudinal axis 28 of the apparatus. Surfaces 24 and 26 encircle the corresponding longitudinal axis of its hub 18, 20 and axis 28. Surfaces 24, 26 form a cylinder, but can also be tapered slightly to form a conical shape.

The wrap spring 22 forms a secure helical engagement with both the first hub surface 24 and the second hub surface 26. No portion of the wrap spring 22 is fixedly attached to either the first hub surface 24 or the second hub surface 26.

When the first hub 18 is rotated in a first rotational direction relative to the second hub 20, coils of the helical wrap spring 22 will become more tightly secured to both the first hub surface 24 and the second hub surface 26. Relative rotation between the first hub 18 and the second hub 20 will thereby be restricted.

Alternately, when the first hub 18 rotates in a second rotational direction, opposite to the first direction, relative to the second hub 20, the coils of the helical wrap spring 22 will loosen about the first hub 18 and the second hub 20. This looseness will permit relative rotation between the first hub 18 and the second hub 20.

A reciprocating piston 30 is mounted within the percussive apparatus 10. One or more axially aligned grooves 32 extend axially on the piston 30. A protuberance 34 extends from a portion of the percussive apparatus 10 into the axially aligned grooves 32. This ensures that the piston will translate axially with substantially no rotation.

Also formed on the piston 30 is one or more helical grooves 36. First hub 18, also called a piston nut, is substantially axially fixed longitudinally with respect to a portion of the percussive apparatus 10, but is rotatable within the percussive apparatus 10. A projection 38 is formed on the hub 18 and extends into the helical groove 36. Whenever the piston 30 reciprocates axially within the percussive apparatus, the projection 38, which engages the helical grooves 36, will force the hub 18 to rotate back and forth relative to the piston 30.

Second hub 20, also called a chuck, is disposed adjacent to first hub 18. The wrap spring 22 interacts with the two hub surfaces as previously described.

As is well known, piston 30 is activated by a percussive fluid, such as air under pressure. Oil, in the form of small droplets, is introduced into the percussive fluid at an appropriate location, such as an air inlet passageway, for the purpose of lubricating the moving parts in the apparatus. The oil eventually is exhausted along with the percussive fluid during the stroke cycle of the device. While in the device, the oil and air mixture comes into contact with the wrap spring clutch 16, leading to the problem described hereinabove.

Figure 2:
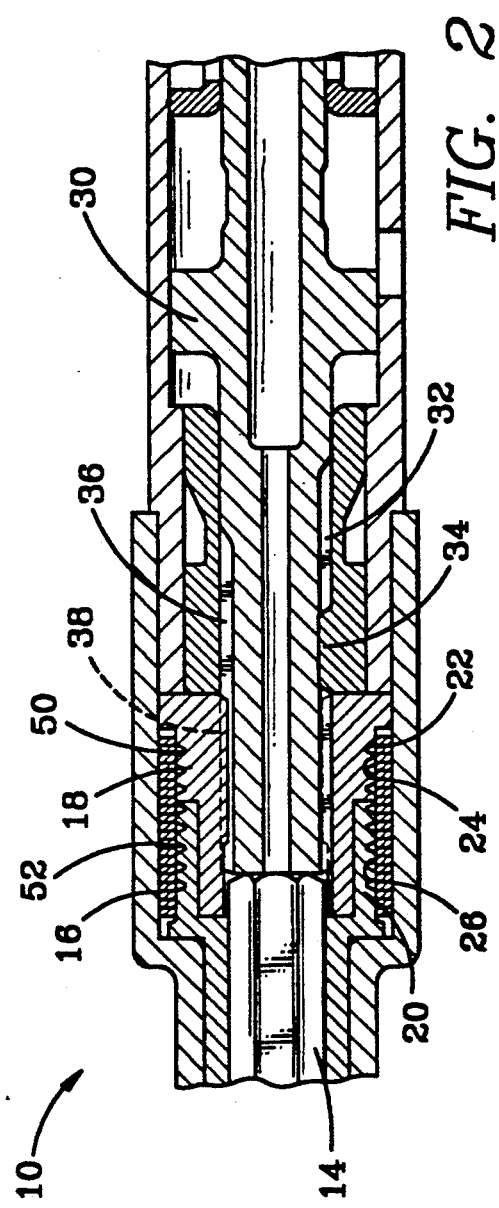
FIG. 2 is a side cross sectional view, with parts removed, of a percussive apparatus having a wrap spring clutch of this invention.

Referring to FIG. 2, there is shown the invention to comprise a plurality of grooves 50 in first surface 24 of first hub 18 extending around a perimeter thereof. In a first embodiment, grooves 50 are substantially parallel to each other, and are positioned in a plane that is transverse to the longitudinal axis of hub 18 and also axis 28.

A similar plurality of grooves 52 are provided in second surface 26 of second hub 20. Grooves 52 are also substantially parallel to each other, and are positioned in a plane that is transverse to the longitudinal axis of second hub 20 and also axis 28. It would be equivalent if grooves 50, 52 were not exactly parallel. I prefer grooves 50, 52 to be machined to a depth of 0.3 inches and a width of 0.06 inches, but the exact dimensions are optional.

It can be understood that grooves 50, 52 provide a passageway below the plane of frictional surfaces 24, 26 for a portion of oil to be transmitted out of the contact area between the coils of spring 22 and hubs 18, 20. This oil is ultimately exhausted along with air during each exhaust cycle of operation. This temporary transmission and storage of oil away from the frictional contact zone of the spring 22 enhances performance of the clutch significantly.

Figure 3:
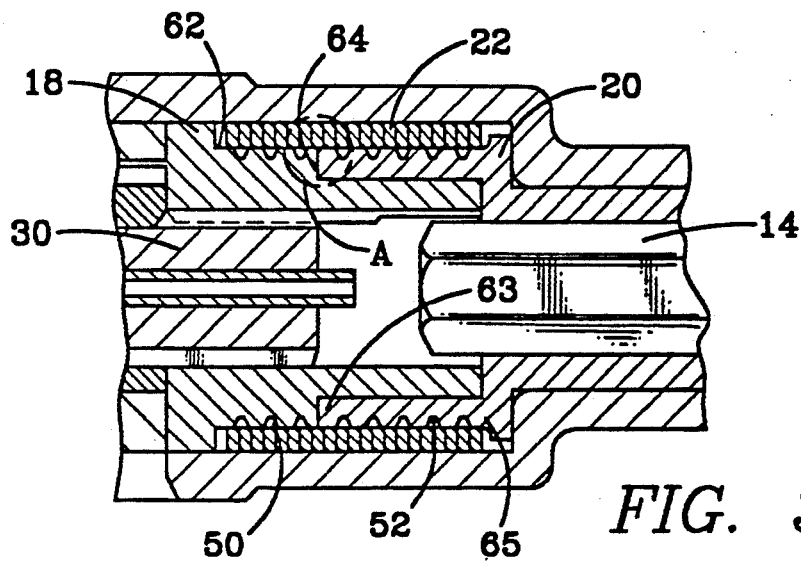
FIG. 3 is an enlarged side cross sectional view, with parts removed, of a percussive apparatus having a wrap spring clutch of this invention.
Figure 4:
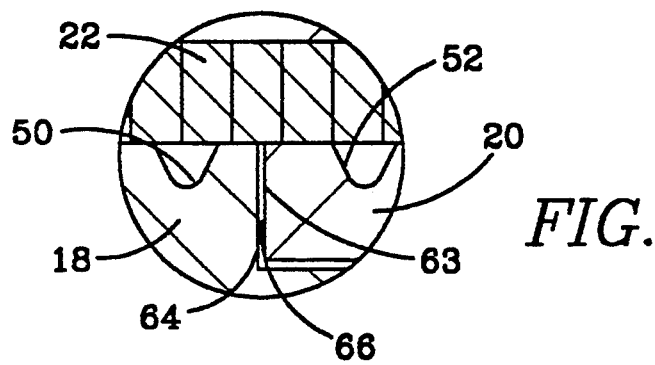
FIG. 4 is an expanded view of the circled area A of FIG. 3.

As shown in FIGS. 3 and 4, hub surface 24 has an upper edge 62 and a lower edge 64, with respect to the longitudinal direction. Likewise, hub surface 26 has an upper edge 63 and a lower edge 65, with respect to the longitudinal direction. Upper edge 63 of second hub 20 is telescoped around first hub 18 to cause upper edge 63 of hub 20 to be positioned adjacent to lower edge 64 of hub 18, with a gap 66 therebetween. It is important that grooves 50, 52 do not extend into or traverse edges 62, 64 because this would provide a space for the coils of spring 22 to become entrapped, especially around gap 66.

An alternate version of grooves 50, 52 would be to provide grooves 50, 52 in a spiral around surfaces 24, 26, respectively. In this embodiment, the direction of the spiral should be opposite to the direction of helical coils of spring.

Also, it would be equivalent to provide any combination of grooves and hubs 18, 20, that is, hub 18 can have parallel grooves 50 and hub 20 can have spiral grooves 52, and vice versa. It would be possible to provide grooves only in one hub 18 or 20, instead of both.

Figure 5:
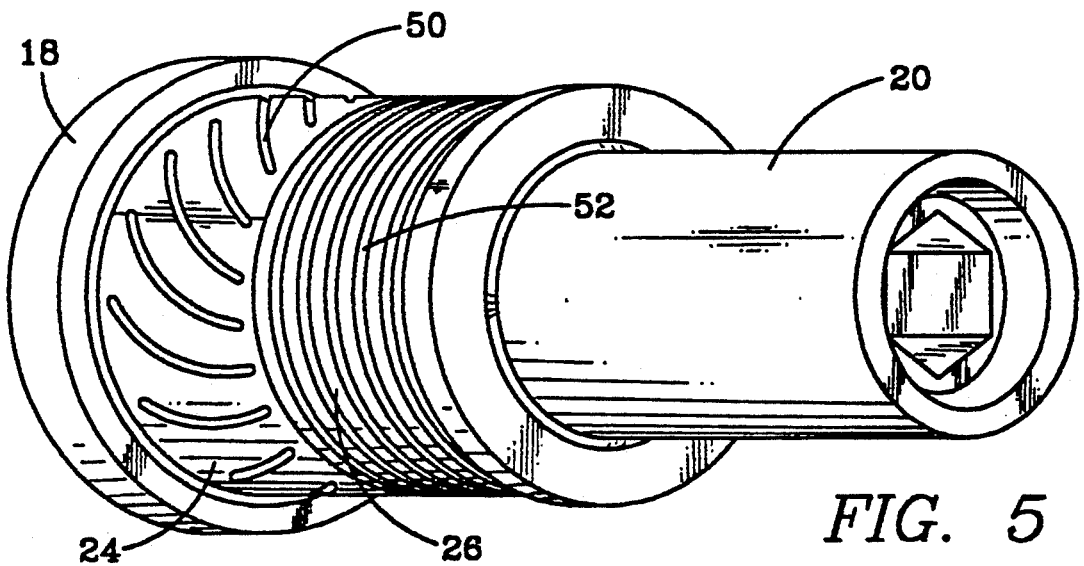
FIG. 5 is an isometric view, with parts removed, showing two types of groove geometry on a hub surface of a wrap spring clutch.
Figure 5A:
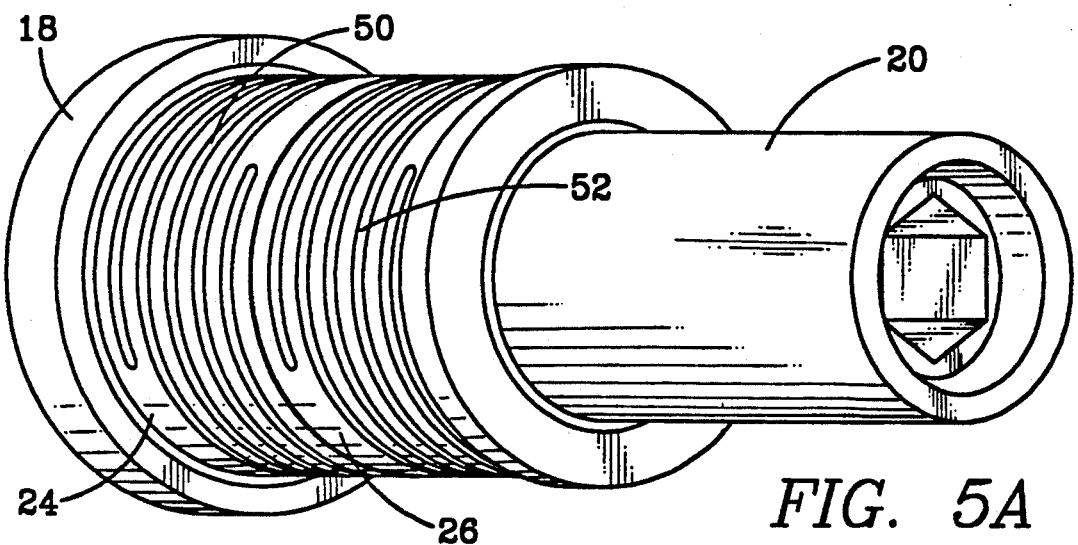
FIG. 5A is a view similar to FIG. 5, with a continuous, spiral groove on one wrap spring clutch hub surface, and a continuous, spiral groove on a second wrap spring clutch hub surface.
Figure 5B:
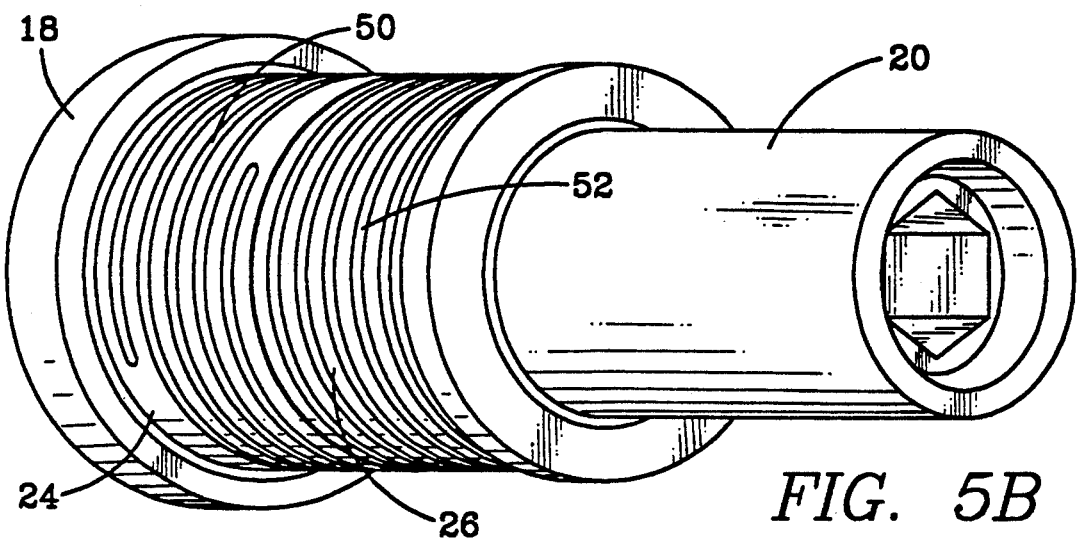
FIG. 5B is a view similar to FIG. 5A, with continuous, spiral groove on one wrap spring clutch hub surface, and a plurality of separate, parallel grooves on a second wrap spring clutch hub surface.
Figure 5C:
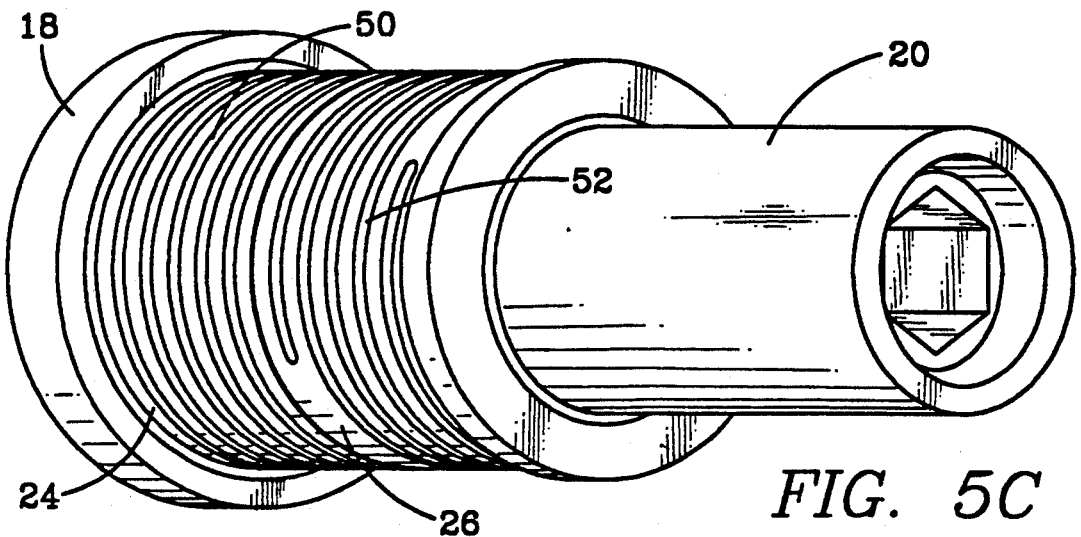
FIG. 5C is a view similar to FIG. 5B, with plurality of separate, parallel grooves on one wrap spring clutch hub surface and a continuous, spiral groove on a second wrap spring clutch hub surface.

FIG. 5 shows two types of groove geometry on the hub surfaces of a wrap spring clutch, one being a plurality of separate, curved grooves 50 on hub surface 24, and the other being a plurality of separate, parallel grooves 52 on hub surface 26. FIG. 5A is a view similar to FIG. 5, with a continuous, spiral groove 50 on hub surface 24 and a continuous, spiral groove 52 on hub surface 26. FIG. 5B is a view similar to FIG. 5A, with continuous, spiral groove 50 of hub surface 24 and a plurality of separate, parallel grooves 52 on hub surface 26. FIG. 5C is a view similar to FIG. 5B, with plurality of separate, parallel grooves 50 on hub surface 24 and a continuous, spiral groove 52 on hub surface 26.

Having described the invention, what is claimed is:

1. In a percussive apparatus activated by a fluid containing a lubricant, a wrap spring clutch assembly for transmitting rotary motion comprising:
   (a) a first hub having a first exterior frictional surface formed thereon, said first surface encircling a first hub longitudinal axis;
   (b) a second hub having a second exterior frictional surface formed thereon, said second surface encircling a second hub longitudinal axis, said second hub being coaxial to said first hub;
   (c) a wrap spring in helical frictional engagement with a portion of both said first frictional surface and said second frictional surface, no portion of said wrap spring being fixedly attached to either said first or said second frictional surface, wherein relative rotary motion between said first hub and said second hub is permitted in a first direction and restricted in a second direction;
   (d) first means on said first hub for transmitting a portion of said lubricant below said first frictional surface;
   (e) second means on said second hub for transmitting a portion of said lubricant below said second frictional surface, said first and second means being positioned entirely between a top and bottom edge of said first and second hub surfaces, respectively, without intersecting said top or bottom edges, whereby frictional engagement of said wrap spring is improved;
   (f) said first means comprising a plurality of grooves in said first surface of said first hub, extending around a perimeter of said hub, said grooves being substantially parallel to each other and each groove positioned in a plate that is transverse to said longitudinal axis of said first hub; and
   (g) said second means comprising a plurality of grooves in said second surface of said second hub, extending around a perimeter of said hub, said grooves being substantially parallel to each other and each groove positioned in a plane that is transverse to said longitudinal axis of said second hub.

2. In a percussive apparatus activated by a fluid containing a lubricant, a wrap spring clutch assembly for transmitting rotary motion comprising:
   (a) a first hub having a first exterior frictional surface formed thereon, said first surface encircling a first hub longitudinal axis;
   (b) a second hub having a second exterior frictional surface formed thereon, said second surface encircling a second hub longitudinal axis, said second hub being coaxial to said first hub;
   (c) a wrap spring in helical frictional engagement with a portion of both said first frictional surface and said second frictional surface, no portion of said wrap spring being fixedly attached to either said first or said second frictional surface, wherein relative rotary motion between said first hub and said second hub is permitted in a first direction and restricted in a second direction;
   (d) first means on said first hub for transmitting a portion of said lubricant below said first frictional surface;
   (e) second means on said second hub for transmitting a portion of said lubricant below said second frictional surface, said first and second means being positioned entirely between a top and bottom edge of said first and second hub surfaces, respectively, without intersecting said top or bottom edges, whereby frictional engagement of said wrap spring is improved;

(f) said first means comprising a first continuous groove in said surface of said first hub, extending in a spiral around a perimeter of said hub;

(g) said second means comprising a second continuous groove in said surface of said second hub, extending in a spiral around a perimeter of said hub; and (h) said first and second grooves spiral in a direction opposite to the helical direction of said wrap spring.

3. In a percussive apparatus activated by a percussive fluid containing a lubricant, said apparatus having a wrap spring clutch assembly for transmitting rotary motion comprising:

(a) a first hub having a first exterior frictional surface formed thereon, said first surface encircling a first hub longitudinal axis;

(b) a second hub having a second exterior frictional surface formed thereon, said second surface encircling a second hub longitudinal axis, said second hub being coaxial to said first hub;

(c) a wrap spring in helical frictional engagement with a portion of both said first frictional surface and said second frictional surface, no portion of said wrap spring being fixedly attached to either said first or said second frictional surface, wherein relative rotary motion between said first hub and said second hub is permitted in a first direction and restricted in a second direction;

(d) means on one of said hubs for transmitting a portion of said lubricant below an exterior surface of said hub, said means being positioned entirely between a top and bottom edge of said hub surface, without intersecting said top or bottom edges, whereby frictional engagement of said wrap spring is improved; and (e) said means for transmitting a portion of said lubricant comprising a continuous groove in said surface of said hub, extending in a spiral around said hub, said groove extending in a direction opposite to a helical direction of said wrap spring.

4. In a percussive apparatus activated by a fluid containing a lubricant, a wrap spring clutch assembly for transmitting rotary motion comprising:

(a) a first hub having a first exterior frictional surface formed thereon, said first surface encircling a first hub longitudinal axis;

(b) a second hub having a second exterior frictional surface formed thereon, said second surface encircling a second hub longitudinal axis, said second hub being coaxial to said first hub;

(c) a wrap spring in helical frictional engagement with a portion of both said first frictional surface and said second frictional surface, no portion of said wrap spring being fixedly attached to either said first or said second frictional surface, wherein relative rotary motion between said first hub and said second hub is permitted in a first direction and restricted in a second direction;

(d) first means on said first hub for transmitting a portion of said lubricant below said first frictional surface;

(e) second means on said second hub for transmitting a portion of said lubricant below said second frictional surface, said first and second means being positioned entirely between a top and bottom edge of said first and second hub surfaces, respectively, without intersecting said top or bottom edges, whereby frictional engagement of said wrap spring is improved;

(f) said first means comprising a continuous groove in said surface of said first hub, extending in a spiral around a perimeter of said hub, said groove extending in a direction opposite to a helical direction of said wrap spring; and (g) said second means comprising a plurality of grooves in said second surface of said second hub, extending around a perimeter of said hub, said grooves being substantially parallel to each other and each groove positioned in a plane that is transverse to said longitudinal axis of said second hub.

5. In a percussive apparatus activated by a fluid containing a lubricant, a wrap spring clutch assembly for transmitting rotary motion comprising:

(a) a first hub having a first exterior frictional surface formed thereon, said first surface encircling a first hub longitudinal axis;

(b) a second hub having a second exterior frictional surface formed thereon, said second surface encircling a second hub longitudinal axis, said second hub being coaxial to said first hub;

(c) a wrap spring in helical frictional engagement with a portion of both said first frictional surface and said second frictional surface, no portion of said wrap spring being fixedly attached to either said first or said second frictional surface, wherein relative rotary motion between said first hub and said second hub is permitted in a first direction and restricted in a second direction;

(d) first means on said first hub for transmitting a portion of said lubricant below said first frictional surface;

(e) second means on said second hub for transmitting a portion of said lubricant below said second frictional surface, said first and second means being positioned entirely between a top and bottom edge of said first and second hub surfaces, respectively, without intersecting said top or bottom edges, whereby frictional engagement of said wrap spring is improved;

(f) said first means comprising a plurality of grooves in said first surface of said first hub, extending around a perimeter of said hub, said grooves being substantially parallel to each other and each groove positioned in a plane that is transverse to said longitudinal axis of said first hub; and (g) said second means comprising a continuous groove in said surface of said second hub, extending in a spiral around a perimeter of said hub, said groove extending in a direction opposite to a helical direction of said wrap spring.

6. In a percussive apparatus activated by a percussive fluid containing a lubricant, said apparatus having a wrap spring clutch assembly for transmitting rotary motion comprising:

(a) a first hub having a first exterior frictional surface formed thereon, said first surface encircling a first hub longitudinal axis;

(b) a second hub having a second exterior frictional surface formed thereon, said second surface encircling a second hub longitudinal axis, said second hub being coaxial to said first hub;

(c) a wrap spring in helical frictional engagement with a portion of both said first frictional surface and said second frictional surface, no portion of said wrap spring being fixedly attached to either said first or said second frictional surface, wherein relative rotary motion between said first hub and said second hub is permitted in a first direction and restricted in a second direction;

(d) means on one of said hubs for transmitting a portion of said lubricant below said exterior surface of said hub, said means being positioned entirely between a top and bottom edge of said hub surface, without intersecting said top or bottom edges, whereby frictional engagement of said wrap spring is improved; and (e) said means for transmitting a portion of said lubricant comprising a plurality of grooves in said surface of said hub, extending around a perimeter of said hub, said grooves being substantially parallel to each other and each groove positioned in a plane that is transverse to said longitudinal axis of said hub.

* * * * *